United States Patent
Hirota et al.

(10) Patent No.: US 8,975,850 B2
(45) Date of Patent: Mar. 10, 2015

(54) DRIVING CONTROL DEVICE OF OPENING AND CLOSING BODY FOR VEHICLE

(71) Applicants: Koichi Hirota, Takahama (JP); Nobuyasu Bessho, Toyota (JP); Masato Yamada, Hekinan (JP); Shinichiro Noda, Nagoya (JP); Tomomasa Inoue, Toyota (JP); Yoshiki Ishikawa, Toyota (JP); Tomoharu Tamaya, Toyota (JP)

(72) Inventors: Koichi Hirota, Takahama (JP); Nobuyasu Bessho, Toyota (JP); Masato Yamada, Hekinan (JP); Shinichiro Noda, Nagoya (JP); Tomomasa Inoue, Toyota (JP); Yoshiki Ishikawa, Toyota (JP); Tomoharu Tamaya, Toyota (JP)

(73) Assignees: Aisin Seiki Kabushiki Kaisha, Kariya-Shi, Aichi-Ken (JP); Toytota Jidosha Kabushiki Kaisha, Toyota-Shi, Aichi-Ken (JP)

( * ) Notice: Subject to any disclaimer, the term of this patent is extended or adjusted under 35 U.S.C. 154(b) by 112 days.

(21) Appl. No.: 13/712,319

(22) Filed: Dec. 12, 2012

(65) Prior Publication Data
US 2013/0147402 A1 Jun. 13, 2013

(30) Foreign Application Priority Data
Dec. 12, 2011 (JP) .................... 2011-271739

(51) Int. Cl.
- H02P 7/00 (2006.01)
- H02K 7/14 (2006.01)
- E05F 15/00 (2006.01)
- E05F 15/12 (2006.01)

(52) U.S. Cl.
CPC .............. *H02K 7/14* (2013.01); *E05F 15/0017* (2013.01); *E05F 15/127* (2013.01); *E05Y 2201/21* (2013.01); *E05Y 2201/22* (2013.01); *E05Y 2201/478* (2013.01); *E05Y 2400/354* (2013.01); *E05Y 2900/546* (2013.01)

USPC .......... 318/466; 318/280; 318/286; 318/266; 318/721

(58) Field of Classification Search
USPC ......... 318/266, 280, 286, 466, 779, 799, 432, 318/434, 445, 453, 473, 721; 49/26, 28
See application file for complete search history.

(56) References Cited

U.S. PATENT DOCUMENTS

| 7,812,554 B2 * | 10/2010 | Takahashi ..................... 318/282 |
| 2010/0242363 A1 | 9/2010 | Hirota et al. |

FOREIGN PATENT DOCUMENTS

| JP | 3411383 B2 | 3/2003 |
| JP | 2007-2589 A | 1/2007 |
| JP | 2010-248884 A | 11/2010 |

* cited by examiner

*Primary Examiner* — Antony M Paul
(74) *Attorney, Agent, or Firm* — Buchanan Ingersoll & Rooney PC

(57) ABSTRACT

There is provided a driving control device of an opening and closing body, which drives the opening and closing body in a closed state by a motor through an idling section thereof. The device includes a calculation section for calculating a rotation speed difference between a rotation speed of the motor in the idling section and a current rotation speed of the motor; and an insertion detection section for detecting insertion of a foreign member based on the calculated rotation speed difference and a predetermined threshold value. The threshold value monotonously decreases according to an increase in the rotation amount of the motor to coincide with a fully-closed state threshold value at a predetermined rotation amount of the motor within an error range of the rotation amount corresponding to the fully-closed state, and to maintain the fully-closed state threshold value to a maximum rotation amount in the error range.

2 Claims, 11 Drawing Sheets

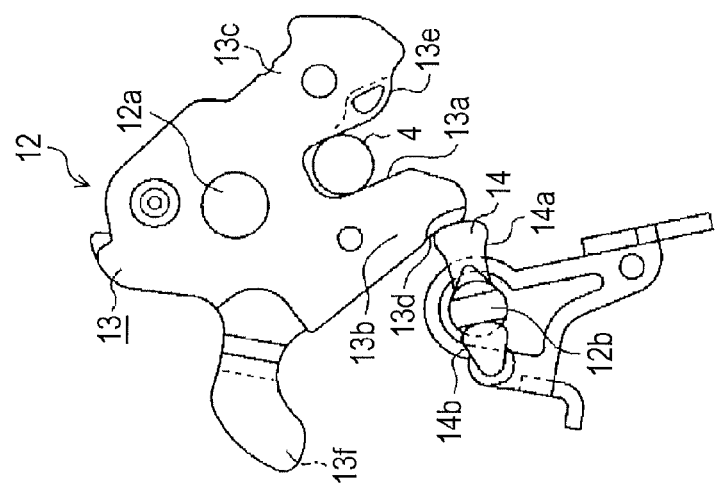
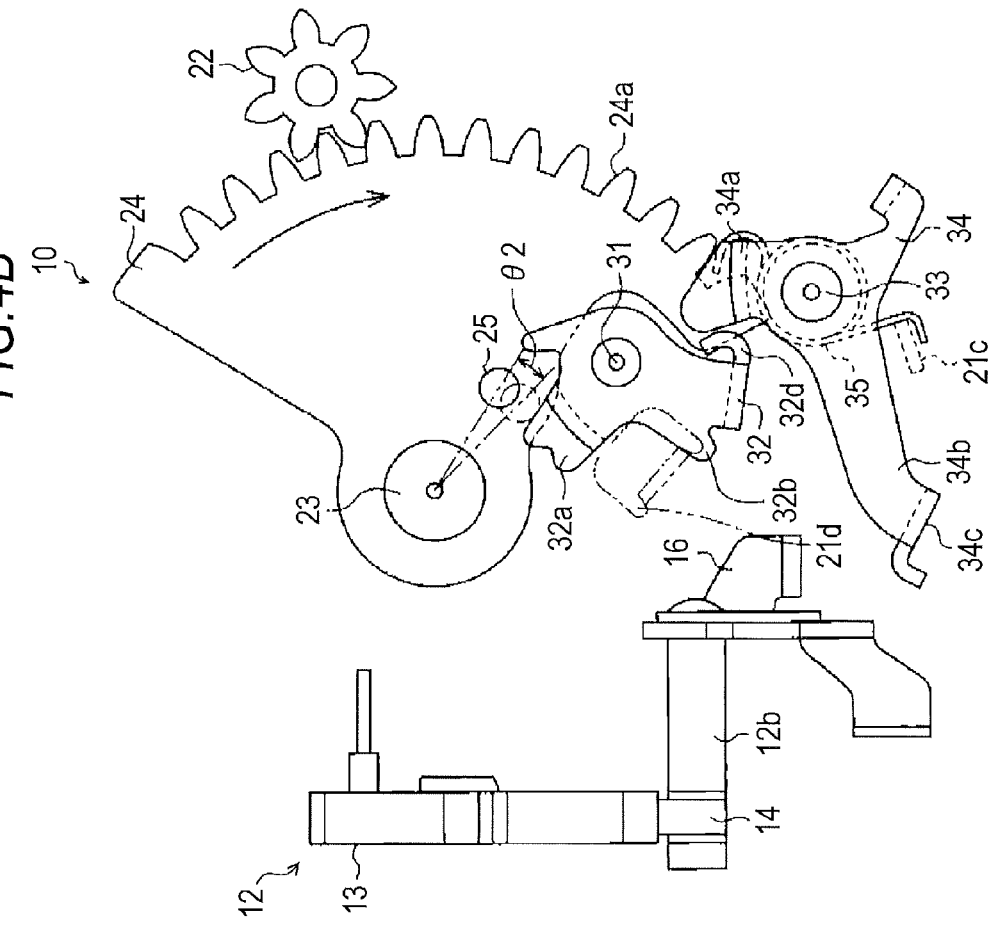

DRIVING CONTROL DEVICE OF OPENING AND CLOSING BODY FOR VEHICLE

CROSS-REFERENCE TO RELATED APPLICATIONS

This application is based on and claims priority under 35 U.S.C. §119 to Japanese Patent Application No. 2011-271739, filed on Dec. 12, 2011, the entire content of which is incorporated herein by reference.

TECHNICAL FIELD

This disclosure relates to a driving control device of an opening and closing body for a vehicle, which includes a detection function for insertion of foreign member when driving the opening and closing body into a closed state.

BACKGROUND DISCUSSION

There have been suggested various types of a driving control device of an opening and closing body for a vehicle. For example, a driving control device of an opening and closing body disclosed in Japanese Patent No. 3411383 (Reference 1) controls driving of a motor so as to perform insertion avoidance processing which stops and reverses driving of the motor, when a foreign member is inserted during the ascending and descending operation of a door glass used as the opening and closing body, by a driving force of a DC motor. The driving control device includes a number of revolutions detection section which detects a number of revolutions of the motor, a rotation torque difference calculation section which calculates a rotation torque difference applied to the DC motor from the number of revolutions difference of the DC motor between a non-load state and a load state, detected by the number of revolutions detection section, a determination section which determines whether a predetermined rotation torque difference is generated in the rotation torque difference calculation section, and an instruction section which instructs execution of the insertion avoidance processing when the determination section determines that the predetermined rotation torque difference is generated. In this case, in the determination of a decreasing degree of the number of revolutions of the DC motor for the insertion determination of the foreign member, the number of revolutions is not compared to a predetermined threshold value which is found empirically or experimentally, but torque (rotation torque difference) which is applied to the DC motor when the foreign member is actually inserted is directly acquired by the calculation. Therefore, it is possible to determine the insertion of the foreign member regardless of the assembly state or the like.

Furthermore, a driving control device of an opening and closing body disclosed in JP 2010-248884A (Reference 2) detects the insertion of the foreign member based on a relationship between a rotation speed difference and a threshold value. The rotation speed difference here is a deviation between a rotation speed of the motor in an idling section for a closing driving from a door-half open state of a back door as the opening and closing body to a fully-closed state thereof and a current rotation speed detected thereafter. Reference 2 also discloses that detection sensitivity of the insertion is changed by varying the threshold value based on a temperature which is assumed from the rotation speed of the motor in the idling section, thereby it is possible to suppress the influence of the temperature characteristics of the motor and more suitably detect the insertion of the foreign member.

FIG. 11 is a graph which illustrates a relationship between a stroke (rotation amount) St of the motor in relation to the opening and closing position of the back door when starting the driving of the motor at the transition of the back door into a door-half open state as a starting point to drive the back door in the closed state, and a rotation speed difference DN. In FIG. 11, the temperature correction of the threshold value is omitted for simplification. As mentioned above, the idling section is set in the motor, a state just before a stroke Sto of the motor when the idling section is finished is considered as a non-load state, and the rotation speed difference DN of that time is set to zero. Moreover, as illustrated by a broken line in FIG. 11, a rotation speed difference $DN_s$ (hereinafter, referred to as "standard rotation speed difference") anticipated to correspond to the stroke Sto, decreases in a step manner just after the stroke Sto where the idling section is finished, and monotonously and continuously decreases until a stroke Ste of the motor where the transition of the back door into the fully-closed state is completed. This is due to the fact that a load is generated just after the stroke Sto to rapidly reduce the rotation speed of the motor, and door reactive force (for example, elasticity of a weather strip which seals the back door in a liquid-tight manner) which becomes a load according to the closing operation of the back door as an increase in stroke St is continuously increased, so that the rotation speed of the motor is continuously reduced. It is needless to say that the standard rotation speed difference becomes a negative number in the entire range of the strokes Sto to Ste.

Moreover, a detection threshold value Th for the insertion detection is calculated according to the following formula based on the standard rotation speed difference illustrated by the broken line.

$$Th = \text{"standard rotation speed difference"} - Z$$

Herein, Z is an insertion determination torque, and is set to a predetermined value (a positive number) based on a rotation speed difference corresponding to a load when the insertion occurs.

Thus, the detection threshold value Th is a value (a negative number) which is further reduced than the standard rotation speed difference illustrated by the broken line, by an insertion determination torque Z. Thereby, the detection threshold value Th is set considering the door reactive force or the like, and an erroneous detection of the insertion is suppressed. Moreover, when it is determined that the actual rotation speed difference DN is lower than the detection threshold value Th, it is considered that a load corresponding to the insertion occurrence is generated, and thus predetermined insertion handling processing (stop and inversion of the motor or the like) is performed.

FIG. 11 also illustrates a transition of the rotation speed difference DN by a bold solid line when the insertion occurs. As illustrated in FIG. 11, a stroke Sth at which the rotation speed difference DN becomes lower than the detection threshold value Th is a detection timing of the insertion.

In the meantime, a stroke Ste corresponding to the fully-closed state of the back door illustrated in FIG. 11 would have a deviation in a predetermined range shown with a dot pattern. That is, the stroke Ste possibly takes from a stroke Ste1 where the stroke St is the smallest to a stroke Ste2 where the stroke St is the largest in the range. This is due to the fact that a relationship between the stroke St of the motor and the opening and closing position of the back door is not uniform due to assembling variation or the like.

Thus, for example, when the transition of the back door to the fully-closed state in the stroke Ste1 is completed, the range of the stroke Ste1 to Ste2 becomes an over-stroke region where the insertion cannot occur. However, even when the transition of the back door to the fully-closed state in the stroke Ste2 is completed, there is a need for the detection of the insertion with a suitable sensitivity. Therefore, if a suitable detection threshold value Th is expressed by a fully-closed state threshold value Thc at the fully-closed state of the back door, the detection threshold value Th needs to be set to become the fully-closed state threshold value Thc at the stroke Ste2.

For this reason, when the transition of the back door to the fully-closed state is completed in a stroke St which is smaller than the stroke Ste2, the detection threshold value Th in that stroke St (and in the proximity thereof) is increased more than the appropriate fully-closed state threshold value Thc. That is, the rotation speed difference DN is more easily lowered than the detection threshold value Th, and the insertion may be erroneously detected.

A need thus exists for a driving control device of an opening and closing body for a vehicle, which is capable of suppressing the erroneous detection of insertion at least in the fully-closed state or in the proximity thereof when driving the opening and closing body into the closed state.

SUMMARY

According to an aspect of this disclosure, there is provided a driving control device of an opening and closing body for a vehicle. The driving control device is configured to drive the opening and closing body into a closed state by driving force of a motor through an idling section of the motor, and stop a closing driving of the opening and closing body in response to a fully-closed state detection section detecting a fully-closed state of the opening and closing body, and comprises: a rotation detection section configured to detect a rotation amount and a rotation speed of the motor; a calculation section configured to calculate a rotation speed difference which is a deviation between the rotation speed of the motor detected in the idling section and a current rotation speed of the motor detected thereafter; and an insertion detection section configured to detect insertion of a foreign member if the calculated rotation speed difference becomes lower than a predetermined threshold value. The threshold value is set to monotonously decrease according to an increase in the rotation amount of the motor along with the closing driving of the opening and closing body so as to coincide with a fully-closed state threshold value corresponding to the fully-closed state of the opening and closing body at a predetermined rotation amount of the motor within an error range of the rotation amount of the motor corresponding to the fully-closed state of the opening and closing body, and to maintain the fully-closed state threshold value from the predetermined rotation amount to a maximum rotation amount in the error range.

BRIEF DESCRIPTION OF THE DRAWINGS

The foregoing and additional features and characteristics of this disclosure will become more apparent from the following detailed description considered with the reference to the accompanying drawings, wherein:

FIGS. 4A and 4B are a side view and a front view which illustrate an operation of the present embodiment;

DETAILED DESCRIPTION

Figure 1:
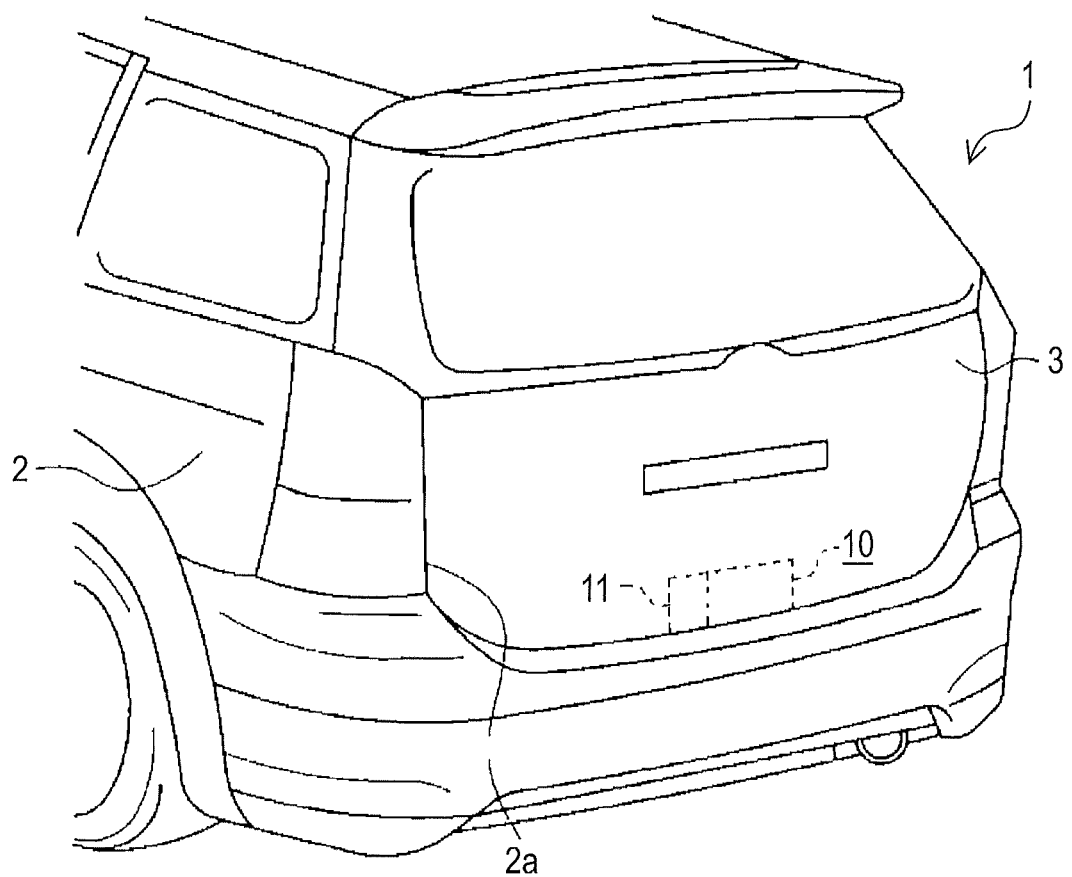
FIG. 1 is a perspective view which illustrates a rear portion of a vehicle to which an embodiment of this disclosure is applied.
Figure 2:
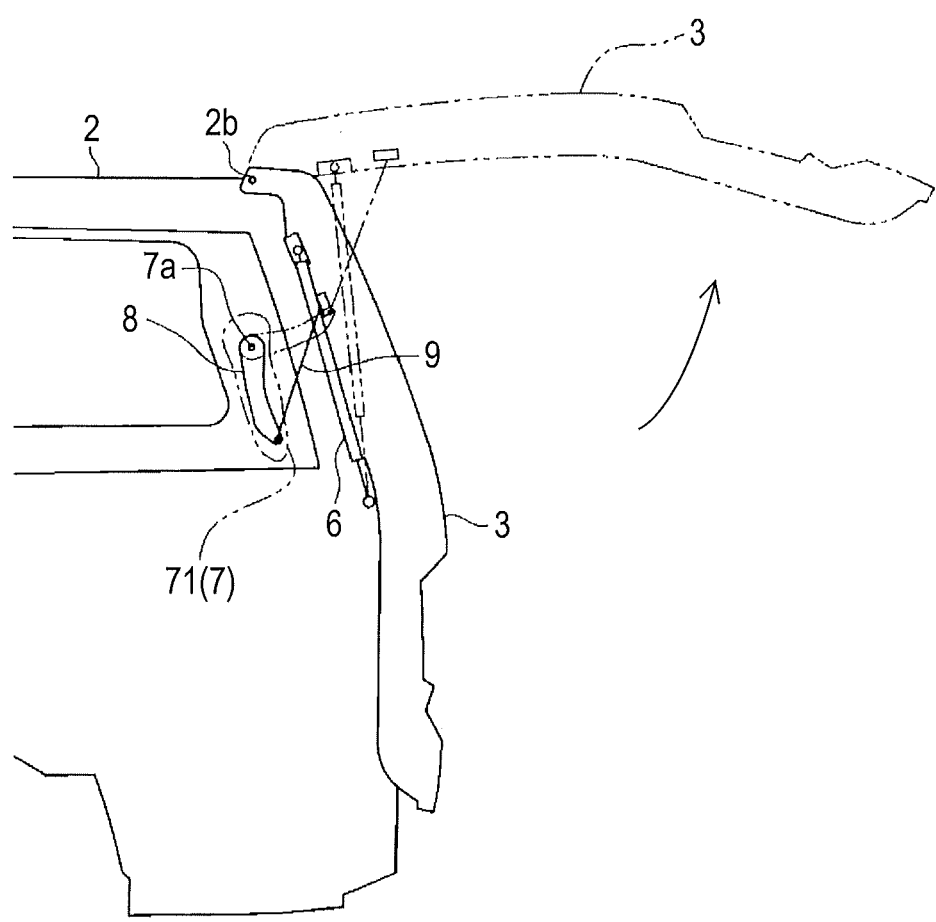
FIG. 2 is a side view which illustrates the rear portion of the vehicle.

An embodiment of this disclosure will be explained with reference to FIGS. 1 to 10. As illustrated in FIG. 1, in a rear portion of a body (a vehicle body) 2 of a vehicle 1, an opening portion 2a is formed. Furthermore, as illustrated in FIG. 2, a back door 3 (an opening and closing body) is attached to the rear portion of the body 2 of the vehicle 1 via a door hinge 2b provided in an upper portion of the opening portion 2a in a freely opened and closed manner. The back door 3 is opened by being pushed upward around the door hinge 2b, and pushing-up of the back door 3 is assisted by gas reactive force of a gas damper 6 which supports the back door 3.

Furthermore, a door driving unit 7 is installed in the rear portion of the body 2. The door driving unit 7 includes a DC motor 71, and a long arm 8 is connected to an output shaft 7a of the DC motor 71 so as to be rotated integrally. A leading end of the arm 8 is rotatably connected to one end of a bar rod 9, and the other end of the bar rod 9 is rotatably connected to the back door 3. Thus, when the door driving unit 7 (DC motor 71) is rotated and driven, the rod 9 is pulled and pushed along with the rotation of the arm 8 integrally with the output shaft 7a, and thus the back door 3 supported by the body 2 is driven into opened and closed states.

As illustrated in FIG. 1, in a leading end of a vehicle interior of the back door 3, a door lock device 10 is provided. The door lock device 10 includes a DC motor 11.

Figure 3A:
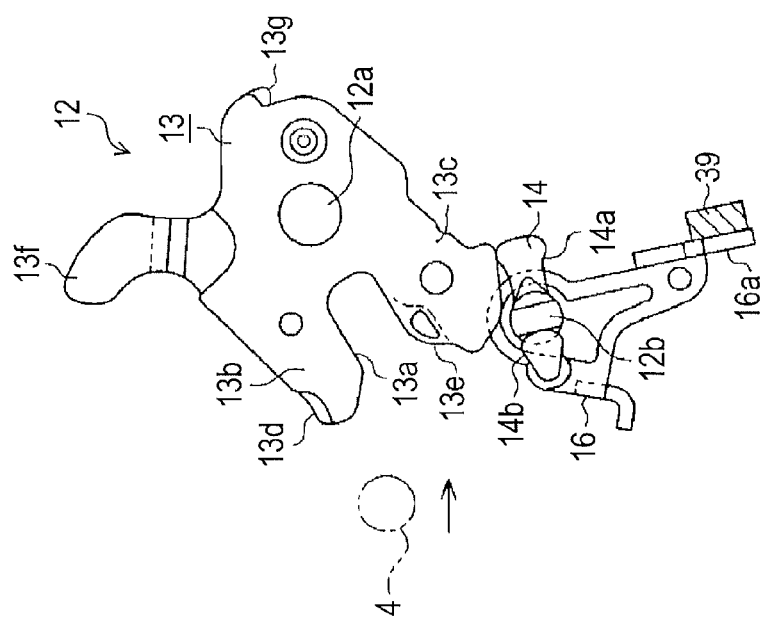
FIGS. 3A and 3B are a side view and a front view which illustrate the present embodiment.
Figure 3B:
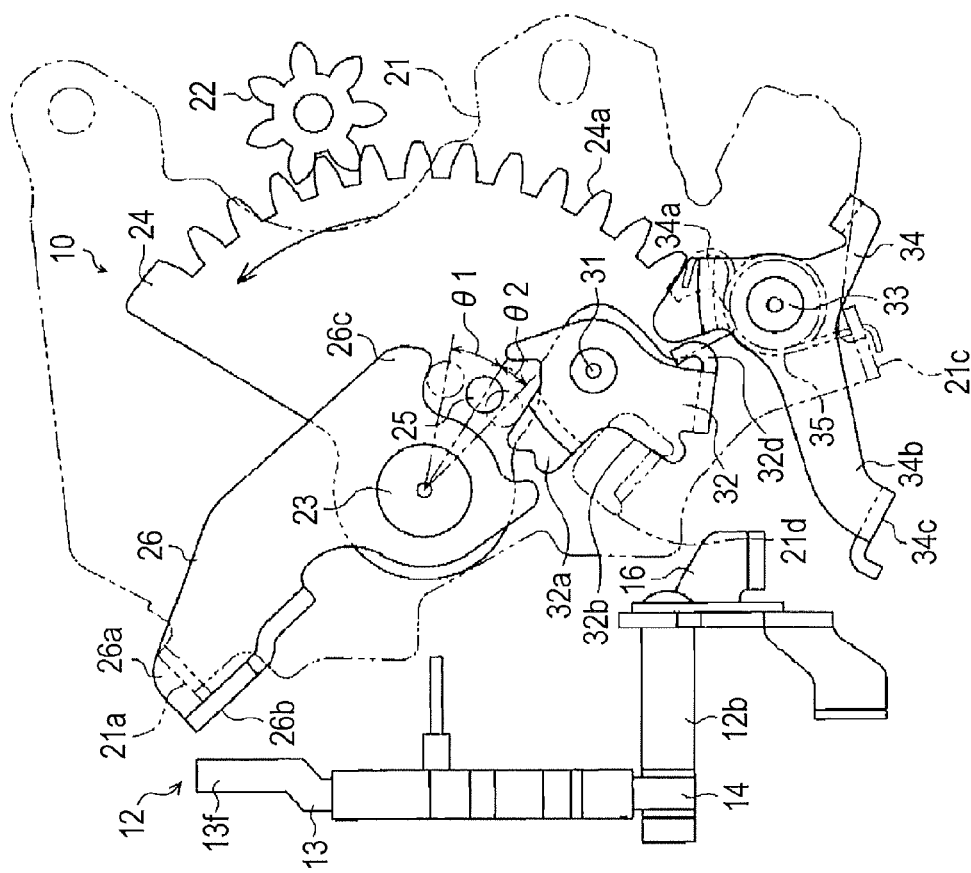

Furthermore, as illustrated in FIGS. 3A and 3B, the door lock device 10 includes a latch mechanism 12 which is supported by the back door 3 via a base plate (not illustrated) which is fixed to the back door 3. The latch mechanism 12 includes a latch 13 and a pole 14 which are rotatably connected around rotary shafts 12a and 12b which are each in parallel to the base plate. The latch 13 (latch mechanism 12) is placed to face a U-shaped striker 4 fixed to the lower portion of the opening portion 2a and can be engaged and disengaged with the striker 4.

Specifically, the latch 13 is formed in a U shape to have an engagement concave portion 13a, and has a first claw portion 13b and a second claw portion 13c on one side and the other side (in FIG. 3A, sides of the clockwise rotation direction and the counterclockwise rotation direction) thereof with the engagement concave portion 13a interposed therebetween. Moreover, in a leading end portion of the first claw portion 13b, a first engagement portion 13d is formed on an opposite side of the engagement concave portion 13a, and in a leading end portion of the second claw portion 13c, a second engagement portion 13e is formed at a side of the engagement concave portion 13a. Furthermore, the latch 13 is formed with a driven convex portion 13f which is extended to an opposite side of the engagement concave portion 13a with the rotary shaft 12a interposed therebetween. One end of a latch biasing spring held in the base plate at the other end thereof is engaged with the latch 13, and thus the latch 13 is biased to a side of being driven to the clockwise rotation direction, and a facing surface 13g of the first claw portion 13b comes into contact with a latch stopper provided in the base plate, and thus the rotation of the latch in the direction is restricted and is held at a predetermined rotation position illustrated in FIG. 3A.

Meanwhile, the pole 14 is connected to the lift lever 16 via the rotary shaft 12b, and is rotated integrally with the lift lever 16 around the rotary shaft 12b. The pole 14 is formed with an engagement end portion 14a and an extension end portion 14b which are each extended to both sides from the rotary shaft 12b (a left and a right side of FIG. 3A). The other end of the pole biasing spring held in the base plate is engaged with the pole 14, and thus the pole 14 is biased to a side of being rotated in a counterclockwise rotation direction, that is, a side of raising the engagement end portion 14a. Furthermore, a stopper contact portion 16a of the lift lever 16 connected to the pole 14 comes into contact with the stopper 39 provided in the base plate, and thus, the rotation thereof in the rotation direction is restricted and is held at a predetermined driving position illustrated in FIG. 3A.

Herein, a basic operation of the latch mechanism 12 will be described. In a state where the back door 3 is opened, as illustrated in FIG. 3A, in the latch 13, the facing surface 13g of the first claw portion 13b comes into contact with the latch stopper, and thus, the latch 13 is held at a predetermined driving position, and the engagement concave portion 13a is opened to face an entry path of the striker 4 accompanied by the closing operation of the back door 3. Furthermore, the pole 14 is held at a predetermined rotation position by the contact of the lift lever 16 with the stopper 39, and the engagement end portion 14a is placed below the second claw portion 13c. In addition, a state of the latch mechanism 12 at this time is called an unlatched state (a release state).

Next, when the striker 4 enters the engagement concave portion 13a according to the closing operation of the back door 3, an inner wall surface of the engagement concave portion 13a is pressed by the striker 4, the latch 13 is rotated in the counterclockwise rotation direction against the latch biasing spring, the engagement end portion 14a is engaged with the second engagement portion 13e, and thus the rotation is stopped. At this time, the back door 3 is in a door-half state of being engaged with the striker 4 in the engagement concave portion 13a to receive the striker 4 so as not to be removed, and the state of the latch mechanism 12 at this time is called a half-latched state.

Next, when the striker 4 further enters the engagement concave portion 13a according to the further closing operation of the back door 3, the inner wall surface of the engagement concave portion 13a is pressed by the striker 4. Thus, as illustrated in FIGS. 4A and 4B, the latch 13 is further rotated in the counterclockwise rotation direction against the latch biasing spring, the engagement end portion 14a is engaged with the first engagement portion 13d, and thus the rotation thereof is stopped. At this time, the back door 3 is in a fully-closed state of being engaged with the striker 4 in the engagement concave portion 13a to hold the striker 4 so as not to be removed, and the state of the latch mechanism 12 of this time is called a fully-latched state (an engagement state).

Furthermore, in the half-latched state or the fully-latched state, when the pole 14 is rotated in the illustrated clockwise rotation direction against the pole biasing spring, engagement of the first engagement portion 13d or the second engagement portion 13e due to the engagement end portion 14a is released. At this time, the latch 13 is biased to the latch biasing spring and is rotated in the clockwise rotation direction while pressing the striker 4 due to the inner wall surface of the engagement concave portion 13a. Moreover, the back door 3 can be disengaged from the striker 4 in the engagement concave portion 13a and can be opened.

As illustrated in FIG. 3B, the door lock device 10 includes a bracket 21 formed of metal which is fixed to the back door 3, and in the bracket 21, a pinion 22 connected so as to be integrally rotated with the output shaft of the DC motor 11 is placed. Moreover, in the bracket 21, a fan-shaped active lever 24 formed of a metal plate is rotatably connected around a rotary shaft 23 having an axis which is extended in a direction different from the axes of the rotary shaft 12a of the latch 13 and the rotary shaft 12b of the pole 14 and in parallel to the rotary shaft of the pinion 22. The active lever 24 has an arched gear portion 24a which is meshed with the pinion 22. Thus, the rotation position of the active lever 24 is maintained by meshing with the pinion 22, and normally, as illustrated in FIG. 3B, is set so as to be maintained at a predetermined driving position (hereinafter, referred to as an "initial position") of being meshed with the pinion 22 in an intermediate portion of the gear portion 24a in a circumferential direction. Moreover, the DC motor 11 is placed at a predetermined initial driving position corresponding to the active lever 24. In addition, the active lever 24 is provided with an active lever pin 25 which is projected parallel to the rotary shaft 23 near the rotary shaft 23 in a plate thickness direction (a front side perpendicular to a paper surface in FIG. 3B).

A passive lever 26 formed of a metal plate as a close side transmission member is rotatably connected to the bracket 21 around the rotary shaft 23. The passive lever 26 has a lever portion 26a which is radially extended from the rotary shaft 23, and a pressing piece 26b which is formed by bending the leading end of the lever portion 26a. A driven convex portion 13f of the latch 13 is placed on a rotation trace in a counterclockwise rotation direction in FIG. 3B of the pressing piece 26b around the rotary shaft 23. Thus, when the passive lever 26 is rotated in the counterclockwise rotation direction in FIG. 3B, driven convex portion 13f is pressed to the pressing piece 26b, and thus, the latch 13 is rotated in the counterclockwise rotation direction in FIG. 3A and is stopped by the pole 14 as mentioned above. For example, the latch mechanism 12 in the half-latched state is switched into a fully-latched state illustrated in FIGS. 4A and 4B.

Figure 5:
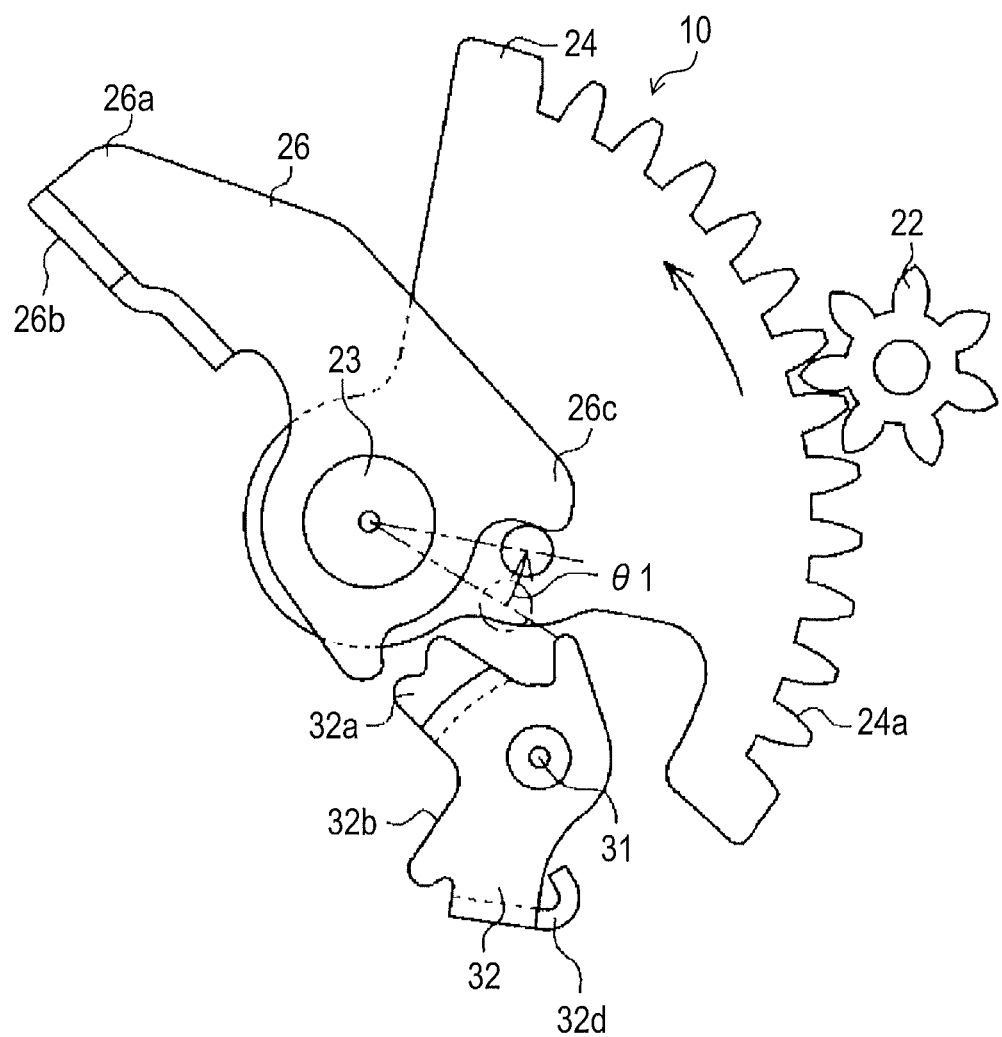
FIG. 5 is a front view which illustrates an operation of the present embodiment.

In addition, in a proximal end portion of the passive lever 26, an engagement piece 26c is formed which is placed on a rotation trace in the counterclockwise rotation direction in FIG. 3B of the active lever pin 25 around the rotary shaft 23. The other end of a return spring (not illustrated), with one end thereof held in the bracket 21, is engaged with the passive lever 26, and thus the passive lever 26 is biased to a side of being rotated in the clockwise rotation direction. Furthermore, the facing surface of the pressing piece 26b comes into contact with the passive lever stopper 21a formed in the bracket 21, thus the rotation in the direction is restricted and the passive lever 26 is held at a predetermined rotation position (hereinafter, referred to as a "close operating initial position") illustrated in FIG. 3B. Moreover, when the passive lever 26 is at the close operating initial position, the active lever pin 25 of the active lever 24 held in the initial position and the engagement piece 26c of the passive lever 26 are placed so as to be separated from each other around the rotary shaft 23 by a predetermined angle θ1. Thus, when the active lever 24 is rotated in counterclockwise rotation direction in FIG. 3B from the initial position, as illustrated in FIG. 5, the active lever 24 idles at the predetermined angle θ1 until the active lever pin 25 comes into contact with the engagement piece 26c, and presses the engagement piece 26c with the active lever pin 25 according to the further rotation after contact with the engagement piece 26c. Thereby, the passive lever 26 is rotated in the counterclockwise rotation direction, and switches the latch mechanism 12 into the full-latched state as mentioned above.

After that, when the active lever 24 is rotated in the clockwise rotation direction (return rotation) and is returned to the initial position, the passive lever 26 released from the active lever pin 25 is biased to the return spring and is returned and rotated to the close operating initial position. Moreover, as illustrated in FIGS. 4A and 4B, the latch 13 is released from the passive lever 26.

Figure 7:
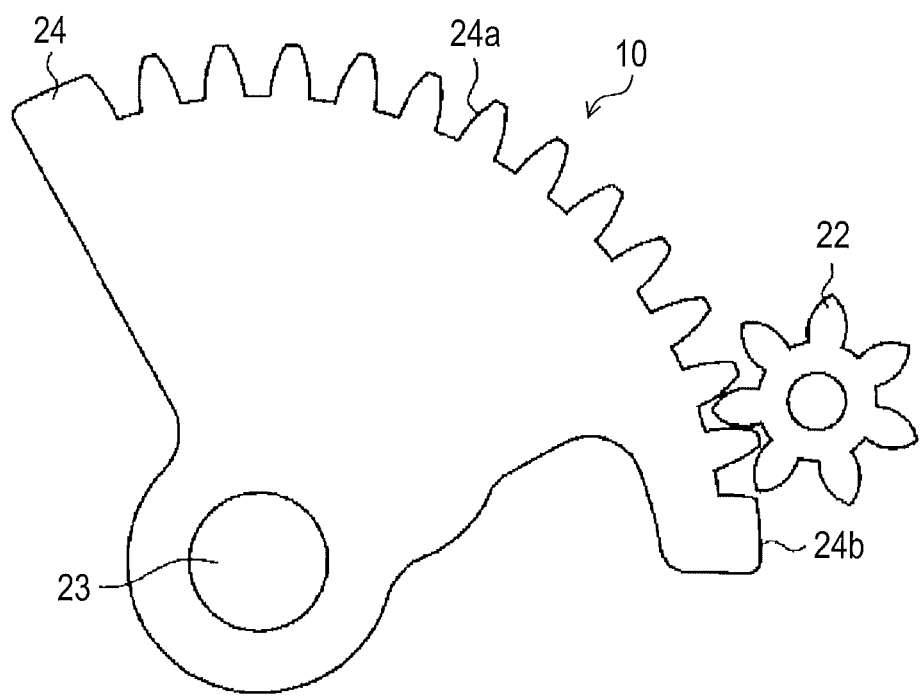
FIG. 7 is a front view which illustrates an operation of the present embodiment.
Figure 8:
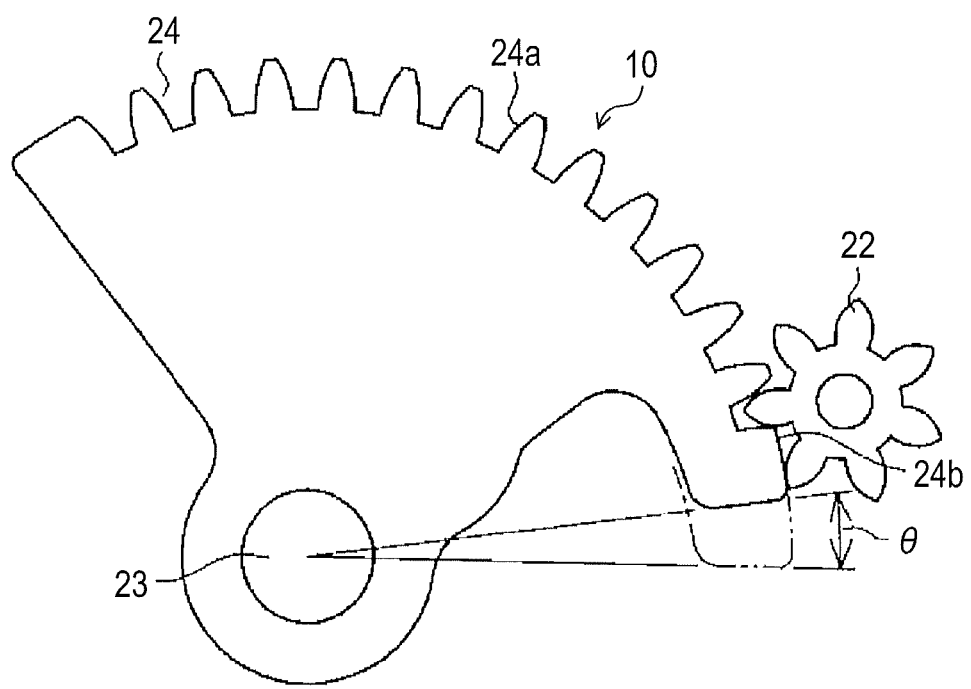
FIG. 8 is a front view which illustrates an operation (an over-stroke state) of the present embodiment.

In addition, as illustrated in FIG. 7, normally, when transition of the latch mechanism 12 to the full-latched state is completed at the rotation position of the active lever 24, the gear portion 24a is meshed to the near side pinion 22 by the restriction portion 24b continuous to the terminal thereof. Thus, as illustrated in FIG. 8, the rotation of the active lever 24 is allowed until the terminal of the gear portion 24a reaches the pinion 22 and is locked by the restriction portion 24b. That is, the rotation angle θ of the active lever 24 at this time is a region of an over-stroke where the latch mechanism 12 is already in the full-latched state (the back door 3 is in the fully-closed state), and the insertion cannot occur.

The region of the over-stroke is set because the rotation position of the active lever 24 and the rotation position of the latch 13 (opening and closing positions of the back door 3) are not in a constant relationship due to the influence of the variation in assembly or the like. In other words, the region of the over-stroke is set based on the predetermined error range which is permitted as the assembling variation mentioned above. The error range is also an error range of the idling section of the active lever 24 (a predetermined angle θ1). In addition, the rotation position of the active lever 24 corresponds to the rotation amount of the DC motor 11 for rotating and driving the active lever 24 one to one. Thus, the region of the over-stroke of the active lever 24 corresponds to the region of the over-stroke of the rotation amount of the DC motor 11.

As illustrated in FIG. 3B, a bell crank 32 formed of a metal plate as an open side transmission member is rotatably connected to the bracket 21 around the rotary shaft 31 in parallel to the rotary shaft 23. The bell crank 32 has a first lever portion 32a and a second lever portion 32b which are extended in both sides in the radial direction from the rotary shaft 31 (left upper and lower sides of FIG. 3B). The rotation of the bell crank 32 in the clockwise rotation direction is restricted up to a predetermined rotation position (hereinafter, referred to as a "release operating initial position") in which the second lever portion 32b comes into contact with the lever stopper 21d formed in the bracket 21. Moreover, when the bell crank 32 is at the release operating initial position, the first lever portion 32a is placed on the rotation trace of the clockwise rotation direction in the active lever pin 25 of FIG. 3B around the rotary shaft 23. In addition, the bell crank 32 has a pressing piece 32d which is formed by bending the leading end portion of the second lever portion 32b.

Furthermore, an open lever 34 formed of a metal plate is rotatably connected to the bracket 21 around the rotary shaft 33 parallel to the rotary shafts 23 and 31. The open lever 34 has lever portions 34a and 34b which are extended to one side and the other side in the radial direction from the rotary shaft 33 (the upper side and the left lower side of FIG. 3B). The lever portion 34a is placed on the rotation trace of the counterclockwise rotation direction in FIG. 3B, of the pressing piece 32d, around the rotary shaft 31. Moreover, when the bell crank 32 is rotated in the counterclockwise rotation direction in FIG. 3B, the open lever 34 is rotated in the clockwise rotation direction by pressing the lever portion 34a to the pressing piece 32d.

Furthermore, the open lever 34 has a pressing piece 34c which is formed by bending the leading end portion of the lever portion 34b, and the lift lever 16 is placed on the rotation trace of the clockwise rotation direction in FIG. 3B of the pressing piece 34c around the rotary shaft 33. Thus, when the latch mechanism 12 is in the full-latched state illustrated in FIGS. 4A and 4B, if the open lever 34 is rotated in the clockwise rotation direction in FIG. 4B, the lift lever 16 is rotated in the clockwise rotation direction in FIG. 4A together with the pole 14 by being pressed to the pressing piece 34c, and as mentioned above, the rotation retainer of the latch 13 due to the pole 14 is released. Moreover, the latch mechanism 12 is switched to the unlatched state.

In addition, the other end of the return spring 35 with one end held on the locking piece 21c formed in the bracket 21 is locked in the lever portion 34a, thus the open lever 34 is biased to a side of being rotated in the counterclockwise rotation direction. Furthermore, the facing surface of the lever portion 34a comes into contact with the pressing piece 32d of the bell crank 32 in which the rotation is restricted in the release operating initial position, thus the rotation thereof in the direction is restricted, and the open lever 34 is maintained at the predetermined driving position illustrated in FIG. 4B.

Figure 6:
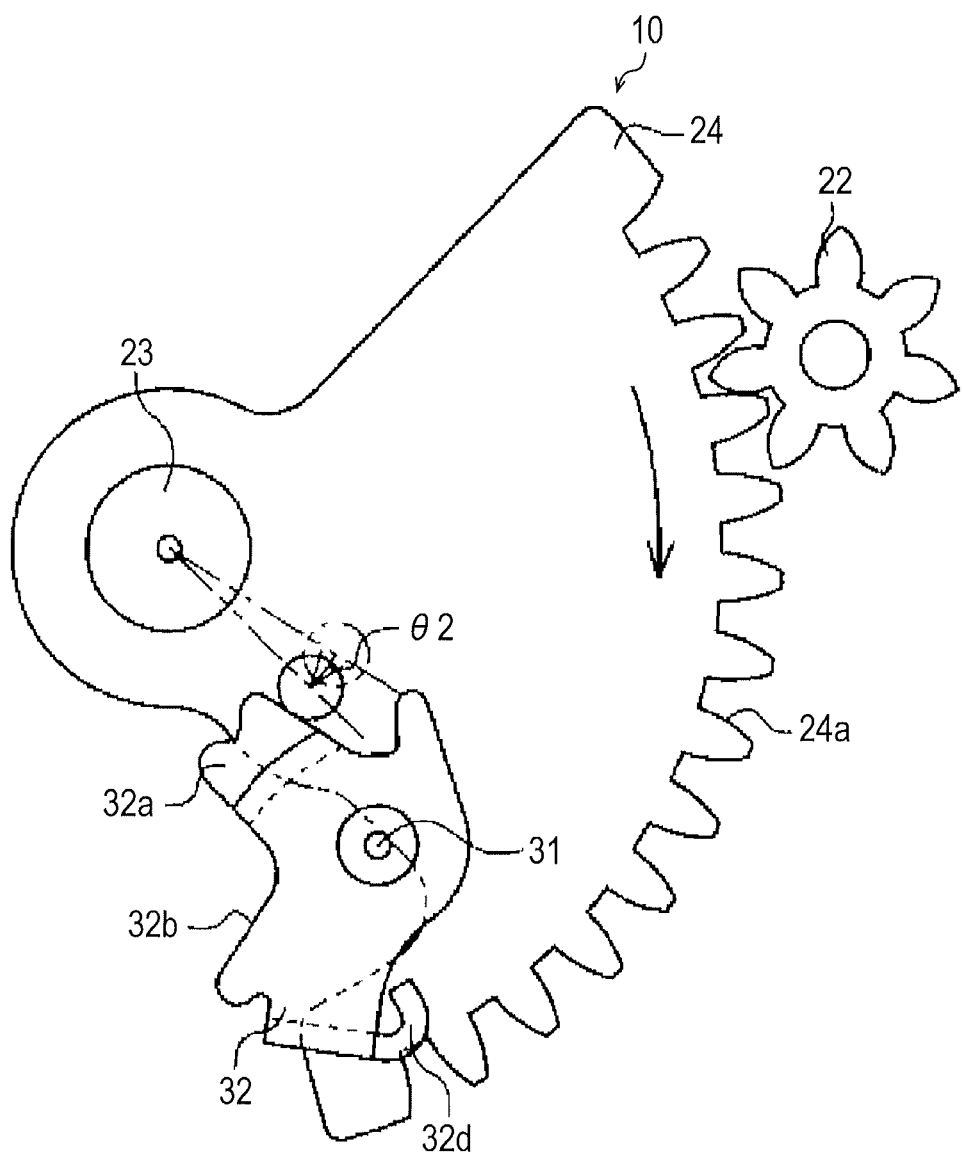
FIG. 6 is a front view which illustrates an operation of the present embodiment.

That is, the bell crank 32 is biased to the return spring 35 via the open lever 34, and is maintained at the release operating initial position. Moreover, when the bell crank 32 is at the release operating initial position, the active lever pin 25 of the active lever 24 maintained at the initial position and the first lever portion 32a of the bell crank 32 are placed so as to be separated from each other by predetermined angle θ2 around the rotary shaft 23. Thus, when the active lever 24 is rotated in the clockwise rotation direction in FIG. 4B from the initial position, as illustrated in FIG. 6, the active lever 24 idles at the predetermined angle θ2 until the active lever pin 25 comes into contact with the first lever portion 32a, and presses the first lever portion 32a by the active lever pin 25 due to the further rotation after contact to the first lever portion 32a. Thereby, the bell crank 32 is rotated in the counterclockwise rotation direction and presses the lever portion 34a of the open lever 34 by the pressing piece 32d. Moreover, the open lever 34 is rotated in the clockwise rotation direction and switches the latch mechanism 12 to the unlatched state as mentioned above.

Thereafter, when the active lever 24 is rotated in the counterclockwise rotation direction (return driving) and is returned to the initial position, the bell crank 32 and open lever 34 released from the active lever pin 25 are biased to the return spring 35 and is returned and rotated to each initial position. Moreover, the lift lever 16 (pole 14) is released from the open lever 34.

In addition, a state where the active lever 24 is not engaged with both of the passive lever 26 and the bell crank 32 is referred to as a no-load state of the DC motor 11.

Figure 9:
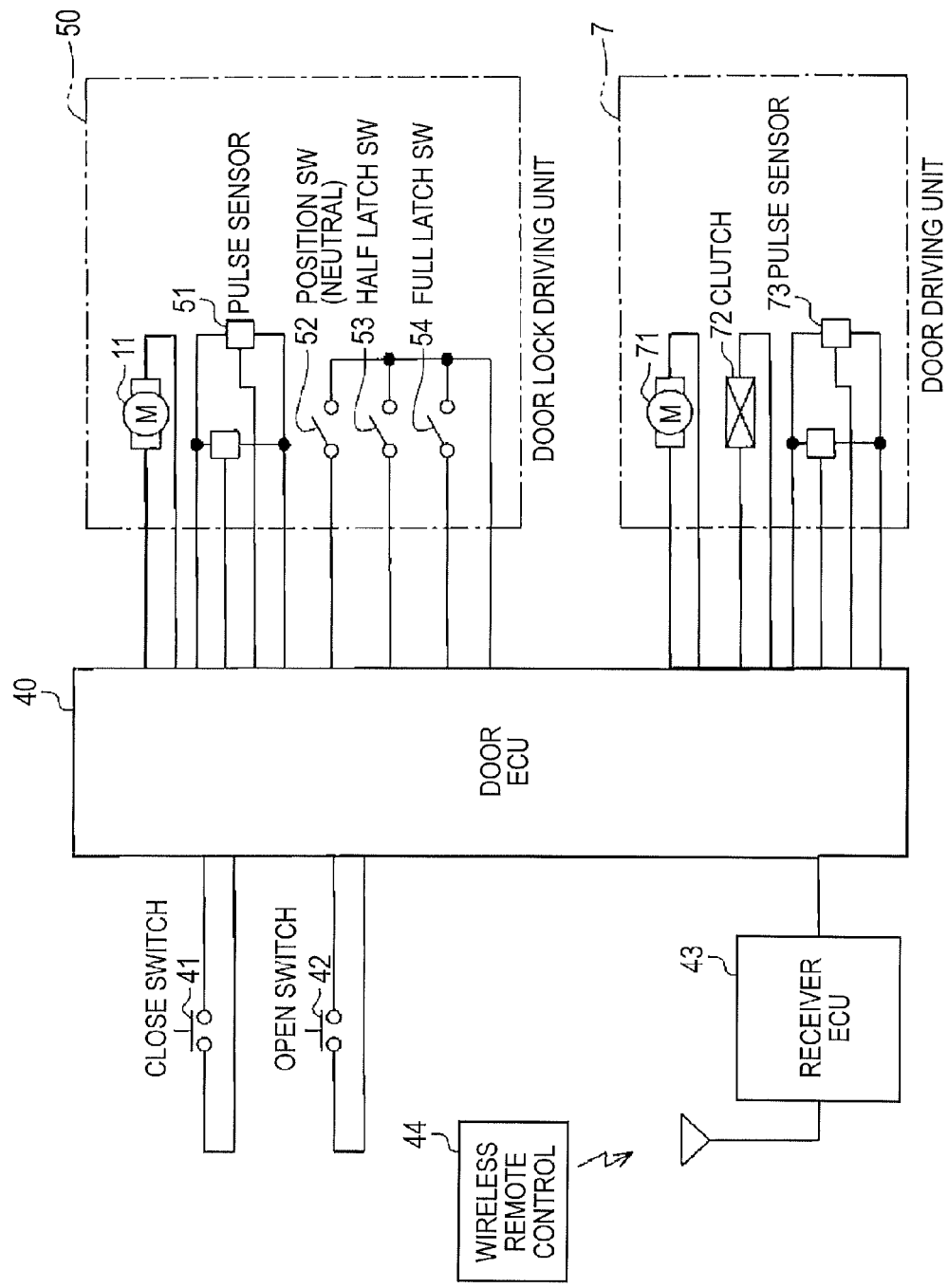
FIG. 9 is a block diagram which illustrates an electrical configuration of the present embodiment.

Next, an electrical configuration of the present embodiment will be described. As illustrated in FIG. 9, a door ECU (Electronic Control Unit) 40 provided in a vehicle 1 mainly includes, for example, a micro control unit (MCU), and is electrically connected to the door driving unit 7. The door driving unit 7 includes the DC motor 71, electromagnetic clutch 72, and a pulse sensor 73. The door ECU 40 drives and controls the DC motor 71 to control opening and closing of the back door 3. Furthermore, the door ECU 40 drives and controls the electromagnetic clutch 72 to switch and control the connection and the disconnection of the power transmission between the DC motor 71 and the arm 8 (the back door 3). This is because, the power transmission is set to the connected state, only when electrically performing the opening and closing driving of the back door 3, and when manually performing the opening and closing operation of the back door 3, the power transmission is set to the non-connected state to realize the smooth opening and closing operation. Furthermore, door ECU 40 detects the rotation direction (forward rotation or a reverse rotation) of the DC motor 71, the rotation amount and the rotation speed, that is, the opening and closing position and the opening and closing speed (the movement speed) of the back door 3 or the like, based on the paired pulse signals having phases different from each other which are output from the pulse sensor 73. Moreover, the door ECU 40 drives and controls the DC motor 71, for example, so that the opening and closing speed of the back door 3 coincides with an objective opening and closing speed, based on the pulse signal from the pulse sensor 73.

Furthermore, the door ECU 40 is electrically connected to a door lock driving unit 50 for the electric driving of the door lock device 10. The door lock driving unit 50 includes the DC motor 11, a pulse sensor 51 as a rotation detection section, a position switch 52, a half-latch switch 53, and a full-latch switch 54 as a fully-closed state detection section (a full-latch detection section). The door ECU 40 drives and controls the DC motor 11 and rotates and controls the active lever 24 via the pinion 22, and switches and controls the latch mechanism 12. Furthermore, the door ECU 40 detects the rotation direction (forward rotation or reverse rotation), the rotation amount (stroke) and the rotation speed N of the DC motor 11, that is, the driving position, the rotation speed or the like of the active lever 24, based on the pair of pulse signals having phases different from each other which are output from the pulse sensor 51. Furthermore, the door ECU 40 detects that the active lever 24 is at the initial position (a neutral position), based on the detection signal which is output from the position switch 52, detects that the latch mechanism 12 is at the half-latched state (the latch 13 is at the driving position corresponding to the half-latched state), based on the detection signal which is output from the half-latch switch 53, and detects that the latch mechanism 12 is at the full-latched state (the latch 13 is at the driving position corresponding to the full-latched state), based on the detection signal which is output from the full-latch switch 54. Moreover, the door ECU 40 drives and controls the DC motor 11, based on the pulse signal from the pulse sensor 51 and the detection signals from the switches 52 to 54.

Furthermore, the door ECU 40 is electrically connected to a close switch 41 and an open switch 42 provided in the back door 3, and a receiver ECU 43 mounted on the vehicle 1. The close switch 41 outputs the operation signal of the effect of performing the closing operation the back door 3 by the operation of a user. Based on the operation signal, the door ECU 40 drives and controls the door driving unit 7 (the DC motor 71 and electromagnetic clutch 72) to close and operate the back door 3 which is in the open state, drives and controls the door lock driving unit 50 (the DC motor 11) based on the transition of the latch mechanism 12 to the half-latched state therewith, and switches the latch mechanism 12 to the full-latched state. In addition, the door ECU 40 stops driving of the door lock driving unit 50 (the DC motor 11) in response to the full-latch switch 54 detecting the full-latched state of the latch mechanism 12.

The open switch 42 outputs the operation signal of the effect of performing the opening operation of the back door 3 by the operation of a user. Based on the operation signal, the door ECU 40 drives and controls the door lock driving unit 50 (the DC motor 11), switches the latch mechanism 12 which is in the full-latched state (or the half-latched state) to the unlatched state, drives and controls the door driving unit 7 (the DC motor 71 and the electromagnetic clutch 72), and opens and operates the back door 3 which is in the operable state.

The receiver ECU 43 configures a radio communication system between a wireless remote control 44 carried by a user, receives the transmitted signal of the effect of performing the closing operation or performing the opening operation of the back door 3 transmitted by the operation of the wireless remote control 44, performs predetermined signal processing to the transmitted signal and outputs the signal to the door ECU 40. The door ECU 40 performs the driving control of the door driving unit 7 (the DC motor 71 and electromagnetic clutch 72) and the driving control of the door lock driving unit 50 (the DC motor 11) when performing the closing operation or performing the opening operation of the back door 3 mentioned above based on the transmitted signal.

Next, the control processing of the door lock device 10 (the door lock driving unit 50) using the door ECU 40 when performing the closing operation of the back door 3 will be further described. The processing is started by the detection of the latch mechanism 12 at the half-latched state, based on the detection signal which is output from the half-latch switch 53 along with the closing operation of the back door 3, for example, manually or electrically.

As mentioned above, the idling section (a predetermined angle $\theta1$) is set in the stroke (the rotation amount) St of the DC motor 11 varying in relation to the rotation position of the active lever 24. When the idling section is finished according to driving of the DC motor 11, the door ECU 40 sets the rotation speed N at this time (in the idling section) to the rotation speed No of the DC motor 11. Moreover, after the stroke St of the DC motor 11 passes through the idling section, the door ECU 40 calculates a rotation speed difference DN (=No−N) between the rotation speed No and the current rotation speed N (a calculation section). It is needless to say that the rotation speed difference DN just after passing through the idling section is zero. That is, in the present embodiment, a state just before the idling section is finished is considered as a non-load state, and the rotation torque difference (corresponding to the load) is assumed, based on the rotation speed difference DN which is a deviation between a rotation speed in the non-load state and a rotation speed in the load state of the DC motor 11.

Moreover, the door ECU 40 compares a magnitude relationship between the rotation speed difference DN and detection threshold value Th as a threshold value corresponding to the stroke St of the DC motor 11 of that time, and detects the insertion of a foreign member when the rotation speed difference DN is lower than detection threshold value Th (insertion detection section). The detection threshold value Th is stored in a memory (for example, ROM) of the door ECU 40 in advance.

When the insertion is detected, the door ECU 40 executes predetermined insertion handling processing (stopping, reversing of the DC motor 11 or the like). Meanwhile, if the insertion is not detected, the door ECU 40 continuously drives the DC motor 11. Along with this, switching of the latch mechanism 12 to the full-latched state is completed, and when the full-latched state of the latch mechanism 12 is detected by the full-latch switch 54, the door ECU 40 stops driving the DC motor 11.

Next, the detection threshold value Th for the insertion detection will be described.

Figure 10:
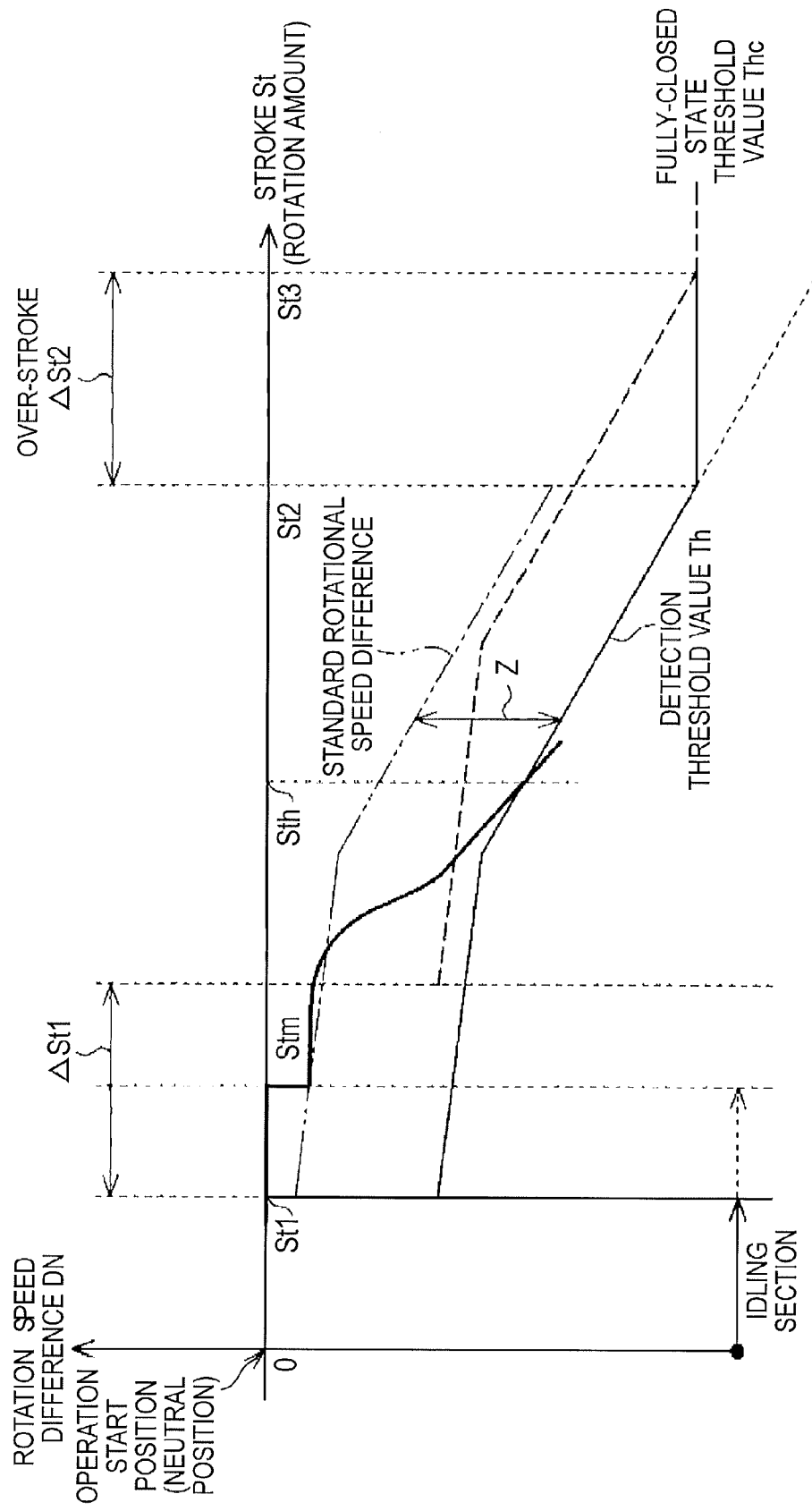
FIG. 10 is a graph which illustrates a transition of a rotation speed difference relative to a stroke of a DC motor.
Figure 11:
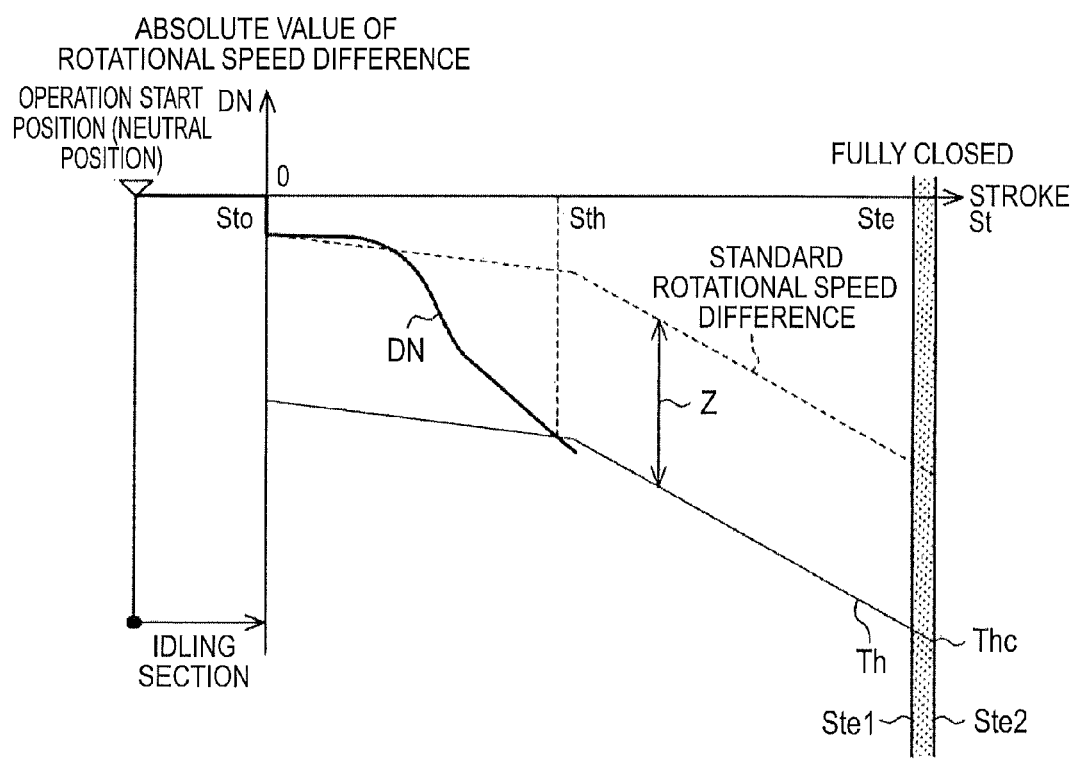
FIG. 11 is a graph which illustrates a transition of a rotation speed difference relative to a stroke of a DC motor according to a related-art technique.

As illustrated in FIG. 10, the stroke St of the DC motor 11, at which the idling section is finished (corresponding to the timing when the active lever 24 (the active lever pin 25) starts pressing of the passive lever 26), deviates within the stroke region $\Delta St1$ corresponding to a predetermined permitted error range.

Similarly, the stroke St of the DC motor 11, at which transition of the latch mechanism 12 to the full-latched state is completed, also deviates within the stroke region $\Delta St2$ due to deviation of the stroke St of the DC motor 11 at which the idling section is finished. The width of the stroke region $\Delta St2$ coincides with the width of the stroke region $\Delta St1$. The stroke region $\Delta St2$ of this time corresponds to the over-stroke region of the DC motor 11.

The detection threshold value Th maintains a predetermined fully-closed state threshold value Thc over the stroke region $\Delta St2$ (the error range) which is the over-stroke region. The fully-closed state threshold value Thc is set to an optimal value which can detect the insertion at the full-latched state (the fully-closed state of the back door 3) of the latch mechanism 12.

Furthermore, the detection threshold value Th decreases in a step manner at the minimum stroke St1 of the DC motor 11 of the stroke region ASH at which the idling section is finished, and monotonously decreases according to the increase in the stroke St of the DC motor 11 so as to coincide with the fully-closed state threshold value Thc at the minimum stroke St2 of the DC motor 11 of the stroke region $\Delta St2$ which is the over-stroke region. The transition of the detection threshold value Th is based on the rotation speed difference DN (illustrated by a two-dot chain line in FIG. 10, hereinafter, also referred to as a "standard rotation speed difference") anticipated after the idling section is finished at the state where the insertion does not occur. That is, normally, the rotation speed N of the DC motor 11, that is, the rotation speed difference DN (the standard rotation speed difference) rapidly decreases by the fact that the active lever pin 25 starts pressing of the engagement piece 26c just after the stroke St at which the idling section is finished, and the rotation speed difference continuously decreases by that door reactive force (for example, elasticity of the weather strip which seals the back door 3 in a liquid-tight manner) which becomes a load according to the closing operation of the back door 3 as the increase of the stroke St is continuously increased. The detection threshold value Th is set in advance, based on the standard rotation speed difference corresponding to the stroke St shifted as mentioned above. Specifically, the detection threshold value Th is a value which subtracts a predetermined insertion determination torque Z (a positive number) corresponding to the load when the insertion occurs, from the standard rotation speed difference.

FIG. 10 illustrates that the stroke St at which the idling section is finished is an intermediate stroke Stm of the stroke region $\Delta St1$, and the transition of the rotation speed difference DN when the insertion occurs, is illustrated by a bold solid line. As illustrated in FIG. 10, from the time when the idling section is finished at the stroke Stm along with driving of the DC motor 11, the rotation speed difference DN at this time becomes zero. Moreover, after the stroke St of the DC motor 11 exceeds the stroke Stm, the rotation speed difference DN rapidly decreases along with the occurrence of the insertion, and thus the insertion is detected in the stroke Sth at which the rotation speed difference DN is lower than the detection threshold value Th. It is needless to say that the detection threshold value Th is set in advance, as mentioned above, regardless of the stroke St (Stm) at which the idling section is finished.

Next, an operation of the present embodiment will be described.

As mentioned above, the detection threshold value Th maintains the fully-closed state threshold value Thc over the stroke region $\Delta St2$ (the error range) which is the over-stroke region. As illustrated by a broken line in FIG. 10, the detection threshold value Th similarly monotonously decreases so as to coincide with the fully-closed state threshold value Thc at the stroke St3 of the maximum DC motor 11 of the stroke region $\Delta St2$ which is the over-stroke region. In this case, for example, in the minimum stroke St2 of the DC motor 11 of the stroke region $\Delta St2$, the detection threshold value Th is raised by an amount corresponding to the slope. Moreover, when transition of the latch mechanism 12 to the full-latched state at the stroke St2 of the DC motor 11 is completed, the insertion is easily detected by the increase of the detection threshold value Th (detection sensitivity of the insertion increases). Normally, since the detection threshold value Th is set by considering so that non-detection of the insertion does not occur even if the erroneous detection of the insertion is allowed, when the insertion is more easily detected due to the increase of the detection threshold value Th mentioned above, the possibility of the erroneous detection of the insertion becomes further higher. In the present embodiment, by maintaining the detection threshold value Th as the fully-closed state threshold value Thc over the stroke region $\Delta St2$ which is the over-stroke region, the erroneous detection of the insertion is suppressed in the full-latch state (the fully-closed state of the back door 3) of the latch mechanism 12 or in the proximity thereof.

As mentioned above, according to the present embodiment, the following effects may be achieved:

(1) In the present embodiment, for example, at the minimum stroke St2 of the DC motor 11 of the stroke region $\Delta St2$ (the error range of the stroke St of the DC motor 11 corresponding to the full-latched state (the fully-closed state of the back door 3) of the latch mechanism 12), the fully-latched state of the latch mechanism 12 is detected by the full latch switch 54, and when transition to the fully-closed state of the back door 3 is completed, the insertion of the foreign member can be detected, based on the detection threshold value Th corresponding to the stroke St2, that is, the optimal fully-closed state threshold value Thc corresponding to the fully-closed state of the back door 3. Meanwhile, for example, even when the fully-latched state of the latch mechanism 12 is detected by the full latch switch 54 and transition of the back door 3 to the fully-closed state is completed at the maximum stroke St3 of the DC motor 11 of the stroke region $\Delta St2$, the insertion of the foreign member can be detected based on the same value (the fully-closed state threshold value Thc). The same is also true for a case where transition of the back door 3 to the fully-closed state is completed at an arbitrary stroke St of the DC motor 11 from the minimum stroke St2 to the maximum stroke St3 of the stroke region $\Delta St2$. Thus, even when there is variation in the stroke St of the DC motor 11 corresponding to the full-latched state (the fully-closed state of the back door 3) of the latch mechanism 12, it is possible to suppress the erroneous detection of the insertion of the foreign member based on the increased threshold value over the variation.

(2) In the present embodiment, the calculation load can be alleviated using a fixed detection threshold value Th which is stored in a memory region of the door ECU 40 in advance.

(3) In the present embodiment, by stopping the driving of the DC motor 11 based on the detection of the full-latched state using the full latch switch 54, for example, as in a case of stopping the drive of the DC motor 11 using the lock of the DC motor 11, it is possible to prevent a wasted over-stroke of the active lever 24 or the excessive drawing of the back door 3 to the closing direction.

(4) In the present embodiment, at the time of the over-stroke of the DC motor 11, by locking the rotation of the pinion 22 (the DC motor 11) by the restriction portion 24b of the active lever 24, it is possible to prevent the excessive drawing of the back door 3 to the closing direction.

In addition, the embodiment mentioned above may be modified as described below.

The detection threshold value Th may be adopted which maintains the fully-closed state threshold value Thc from an intermediate predetermined stroke Stm1 (St2<Stm1<St3) within the stroke region ΔSt2 (the error range) which is the over-stroke region to the maximum stroke St3. In this case, the detection threshold value Th may monotonously decrease according to the increase of the stroke St of the DC motor 11 as in the embodiment mentioned above so as to coincide with the fully-closed state threshold value Thc at the stroke Stm 1 of the DC motor 11. By such a modification, it is possible to suppress the erroneous detection of the insertion of the foreign member, at least in the maximum stroke St3 of the stroke region ΔSt2 (the error range) or in the proximity thereof.

In the embodiment mentioned above, the rotation speed difference DN is used which is basically a negative number in the detection of the insertion. On the contrary, even if changing so as to take the adjustment in the comparison with a detection threshold value concerning polarity of the detection threshold value and the insertion detection in accordance with polarity, using an absolute value (a positive number) of the rotation speed difference DN, this disclosure does not deviate. That is, since the "detection threshold value" defines the boundary whether there is an insertion state, when the "rotation speed difference DN" serving as a comparison target is indicated by a negative number, it is determined that the difference "is lower than" the detection threshold value and there is an insertion state. Furthermore, when the "rotation speed difference DN" is indicated by the absolute value, it is determined that the difference "is greater than" the detection threshold value and there is an insertion state. Thus, the expression "the calculated rotation speed difference DN is lower than a predetermined threshold value" is defined that "the difference is greater than the predetermined threshold value" when the calculated rotation speed difference DN is compared to the absolute value.

A function (a door release function) which switches the door lock device 10 from the fully-latched state to the unlatched state may be omitted.

In the embodiment mentioned above, an AC motor may be adopted instead of the DC motor 11.

As the opening and closing body, a swing door, a slide door, a trunk lid, a sun roof, a window pane or the like may be adopted. Furthermore, the driving mechanism for electrically connecting the opening and closing body and the motor is arbitrary, and when the idling section of the motor is set, a link mechanism, a cam mechanism, a gear mechanism, a cable (a rope or belt), an electric mechanism, a screw mechanism, or a combination thereof may be suitably adopted. In brief, one of these may be adopted where a predetermined error range (deviation) exists between the rotation amount (the stroke St) of the motor and the fully-closed state of the opening and closing body.

Next, a technical idea will be described herein which can be appreciated from the embodiment mentioned above and other examples.

(a) A vehicle door closer device comprises: a latch mechanism which is switchable among a fully-latched state for maintaining a vehicle door in a fully-closed state, a half-latched state of maintaining the vehicle door in a door-half state, and an un-latched state for not maintaining the vehicle door; a closed side transmission member connected to the latch mechanism; a motor which transmits driving force to the latch mechanism via the closed side transmission member through an idling section of the motor, switches and drives the latch mechanism in the half-latched state to the fully-latched state, and stops the switch driving of the latch mechanism in response to a full latch detection section detecting the fully-latched state of the latch mechanism; a rotation detection section which detects a rotation amount and a rotation speed of the motor; a calculation section which calculates a rotation speed difference which is a deviation between the rotation speed of the motor detected in the idling section and a current rotation speed of the motor detected thereafter; and an insertion detection section which detects insertion of a foreign member if the calculated rotation speed difference being lower than a predetermined threshold value. The threshold value is set to monotonously decreases according to an increase in the rotation amount of the motor along with the switch-driving of the latch mechanism so as to coincide with a fully-closed state threshold value corresponding to the fully-latched state of the latch mechanism at a predetermined rotation amount within an error range of the rotation amount of the motor corresponding to the fully-latched state of the latch mechanism, and to maintain the fully-closed state threshold value from the predetermined rotation amount to a maximum rotation amount in the error range. According to this configuration, for example, the fully-latched state of the latch mechanism is detected by the fully-latched detection section, at the predetermined rotation amount of the motor within the error range, and when the transition of the latch mechanism to the fully-latched state is completed, it is possible to detect the insertion of the foreign member using the insertion detection section, based on the threshold value corresponding to the rotation amount, that is, an optimal threshold value of the fully-closed state corresponding to the fully-latched state of the latch mechanism. Meanwhile, for example, even when the fully-latched state of the latch mechanism is detected by the fully-latched detection section and the transition of the latch mechanism to the fully-latched state is completed at the maximum rotation amount of the motor in the error range, it is possible to detect the insertion of the foreign member by the insertion detection section, based on the same value (threshold value of the fully-closed state). The same is also true for a case where the transition of the latch mechanism to the fully-latched state is completed, in a certain rotation amount of the motor from the predetermined rotation amount of the error range to the maximum rotation amount. Thus, even when there is variation in the rotation amount of the motor corresponding to the fully-latched state of the latch mechanism, it is possible to suppress the erroneous detection of the insertion of the foreign member, based on the increased threshold value at least in the maximum rotation amount of the error range or in the proximity thereof.

Further, according to a first aspect of this disclosure, there is provided a driving control device of a opening and closing body for a vehicle. The driving control device is configured to drive the opening and closing body into a closed state by driving force of a motor through an idling section of the motor, and stop a closing driving of the opening and closing body in response to a fully-closed state detection section detecting a fully-closed state of the opening and closing body, and comprises: a rotation detection section configured to detect a rotation amount and a rotation speed of the motor; a calculation section configured to calculate a rotation speed difference which is a deviation between the rotation speed of the motor detected in the idling section and a current rotation speed of the motor detected thereafter; and an insertion detection section configured to detect insertion of a foreign member if the calculated rotation speed difference becomes lower than a predetermined threshold value. The threshold value is set to monotonously decrease according to an increase in the rotation amount of the motor along with the closing driving of the opening and closing body so as to coincide with a fully-closed state threshold value corresponding to the fully-closed state of the opening and closing body at a predetermined rotation amount of the motor within an error range of the rotation amount of the motor corresponding to the fully-closed state of the opening and closing body, and to maintain the fully-closed state threshold value from the predetermined rotation amount to a maximum rotation amount in the error range.

According to this configuration, for example, when the fully-closed state of the opening and closing body is detected by the fully-closed state detection section in the predetermined rotation amount of the motor within the error range, and when the transition of the opening and closing body to the fully-closed state is completed, it is possible to detect the insertion of the foreign member using the insertion detection section, based on the threshold value corresponding to the rotation amount, that is, the optimal fully-closed state threshold value corresponding to the fully-closed state of the opening and closing body. Meanwhile, for example, at the maximum rotation amount of the motor in the error range, even when the fully-closed state of the opening and closing body is detected by the fully-closed state detection section and the transition of the opening and closing body to the fully-closed state is completed, it is possible to detect the insertion of the foreign member by the insertion detection section, based on the same value (the fully-closed state threshold value). The same is also true for a case where the transition of the opening and closing body to the fully-closed state is completed where a certain rotation amount of the motor is from the predetermined rotation amount of the error range to the maximum rotation amount. Thus, even when there is variation in the rotation amount of the motor corresponding to the fully-closed state of the opening and closing body, it is possible to suppress the erroneous detection of the insertion of the foreign member, based on the increased threshold value at least in the maximum rotation amount of the error range or in the proximity thereof.

According to a second aspect, in the driving control device of the first aspect, the predetermined rotation amount is set to a minimum rotation amount of the error range.

According to this configuration, for example, even when the fully-closed state of the opening and closing body is detected by the fully-closed state detection section in the minimum rotation amount of the motor of the error range, and the transition of the opening and closing body to the fully-closed state is completed, it is possible to detect the insertion of the foreign member using the insertion detection section, based on the same value (the fully-closed state threshold value). The same is also true for a case where the transition of the opening and closing body to the fully-closed state is completed, where a certain rotation amount of the motor is from the minimum rotation amount to the maximum rotation amount of the error range. Thus, even when there is variation in the rotation amount of the motor corresponding to the fully-closed state of the opening and closing body, it is possible to suppress the erroneous detection of the insertion of the foreign members based on the increased threshold value over such variation.

According to the above disclosure, it is possible to provide a driving control device of an opening and closing body for a vehicle which is capable of suppressing the erroneous detection of the insertion in the fully-closed state or in the proximity thereof when driving the opening and closing body into the closed state.

The principles, preferred embodiment and mode of operation of the present invention have been described in the foregoing specification. However, the invention which is intended to be protected is not be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within spirit and scope of the present invention as defined in the claims, be embraced thereby.

What is claimed is:

1. A driving control device of a opening and closing body for a vehicle, the driving control device configured to drive the opening and closing body into a closed state by driving force of a motor through an idling section of the motor, and stop a closing driving of the opening and closing body in response to a fully-closed state detection section detecting a fully-closed state of the opening and closing body, the driving control device comprising:
   a rotation detection section configured to detect a rotation amount and a rotation speed of the motor;
   a calculation section configured to calculate a rotation speed difference which is a deviation between the rotation speed of the motor detected in the idling section and a current rotation speed of the motor detected thereafter; and
   an insertion detection section configured to detect insertion of a foreign member if the calculated rotation speed difference becomes lower than a predetermined threshold value,
   wherein the threshold value is set to monotonously decrease according to an increase in the rotation amount of the motor along with the closing driving of the opening and closing body so as to coincide with a fully-closed state threshold value corresponding to the fully-closed state of the opening and closing body at a predetermined rotation amount of the motor within an error range of the rotation amount of the motor corresponding to the fully-closed state of the opening and closing body, and to maintain the fully-closed state threshold value from the predetermined rotation amount to a maximum rotation amount in the error range.

2. The driving control device according to claim 1,
   wherein the predetermined rotation amount is set to a minimum rotation amount in the error range.

* * * * *